United States Patent Office 3,823,170
Patented July 9, 1974

3,823,170
PHOSPHATIDES
Paul A. Seaberg and Lester P. Hayes, Decatur, Ill., assignors to A. E. Staley Manufacturing Company, Decatur, Ill.
No Drawing. Filed Dec. 7, 1972, Ser. No. 313,017
Int. Cl. A23j 7/00; C07f 9/02
U.S. Cl. 260—403
15 Claims

ABSTRACT OF THE DISCLOSURE

Modified lecithin products exhibiting improved emulsification properties are directly obtained from crude vegetable oils under an integrated and continuous process. The crude oils are initially treated with a small amount of aqueous acid anhydride with the resultant acetylated wet gum being partitioned from the crude oil. The acetylated wet gum is then admixed with a base and subjected to controlled process conditions under elevated drying conditions to provide a dry modified lecithin product having an acid value of about 10 to about 25.

BACKGROUND OF THE INVENTION

In the refining of crude vegetable oils, it is conventional to remove phosphatides (frequently referred to as lecithin (from the oil. This process is commonly referred to as "degumming."

A plurality of means for degumming crude vegetable oils has been proposed and used commercially. The most common degumming process entails initially hydrating the lecithin of the crude oil whereupon the hydrated lecithin becomes oil insoluble and migrates to the aqueous phase. The resultant oils substantially free from lecithin and aqueous phase containing the lecithin (frequently referred to as wet gum) are then separated from one another.

The inability to provide a break-free oil is a major disadvantage with most water degumming processes. A process adapted to provide a breakfree oil is described in U.S. Pat. No. 2,782,216 by L. P. Hayes et al. Instead of refining the crude oil with alkali, this degumming process treats the crude oil with water and a small amount of an acid anhydride prior to separation of the wet gum therefrom.

Irrespective of the crude oil refining process, it is conventional to provide a fluid lecithin oil product by removing substantially all of the water from the wet gum. Although dried wet gums *per se* have been extensively used as emulsifiers, improved emulsification properties are achieved by treating either the wet gum or dried lecithin product with chemical reagents. In general, these processes entail treating the lecithin with either a base and/or acid. In U.S. Pat. No. 3,301,881, a wet gum is chemically reacted with a carboxylic acid anhydride, the reaction material is then admixed with a base and dried. In U.S. Pat. No. 3,499,017, a natural, unbleached soybean phosphatide emulsion is treated with a sufficient amount of base to reduce its acid value to about zero. Pursuant to U.S. Pat. No. 3,499,017, substantial hydrolysis occurs since about one-half to two-thirds of the phosphatide material is converted to lyso derivatives. Pursuant to the 3,499,017 patent, the hydrolyzed lecithin product is then reacted with an organic acid anhydride and dried. In another patent, U.S. Pat. No. 3,576,831, there is disclosed a process for treating an aqueous phosphatide emulsion with a mineral acid, followed by neutralization thereof with a base and drying the emulsion. In still another patent (U.S. Pat. No. 3,259,201), the lecithin or wet gum is treated with acetic anhydride, neutralized with a base and dried.

The sequence of processing steps, the stage at which the chemical reagents are added, the amount of reagents used, the temperature and period of treatment as well as other processing variables are disclosed as having a pronounced effect upon the ultimate product. In general, the prior art processes either required recovery and treatment of the degummed lecithin product with an acid, followed by base neutralization and/or reaction therewith and drying of the resultant modified product as well as the reverse sequence steps wherein the lecithin is first treated with a base and then an acid. Fluidity considerations are usually given as the prime reason for adding a base to an acid treated lecithin.

OBJECTS

It is an object of the present invention to simplify the overall processing conditions and equipment requirements for producing lecithin products exhibiting improved properties.

Another object of the invention is to provide a process wherein a high grade lecithin product can be directly and continuously produced from a wet gum.

A still further object is to significantly reduce the period of time in which a lecithin product, derived via crude vegetable oil degumming process, can be processed into a high grade, fluid lecithin product.

DESCRIPTION OF THE INVENTION

The present invention entails a process wherein crude vegetable oil and water is treated with a small amount of acid anhydride prior to the partitioning of the lecithin containing aqueous phase from the oil phase, partitioning the wet gum (i.e., aqueous phase), admixing an alkaline earth and/or alkali metal base to the partitioned wet gum and drying the admixture at a temperature of at least 140° F. with the amount of base, temperature and period of treatment at elevated temperatures being sufficient to provide a dry lecithin product having an acid value ranging from about 10 to about 25.

Although the process is generally applicable to phosphatides of a leguminous seed origin, it is particularly adapted to those obtained from the oil extraction of soybeans with hydrocarbon solvent such as hexane. A suitable process for preparing the wet gum substrate herein is disclosed in U.S. Pat. No. 2,782,216 by L. P. Hayes et al. In the Hayes et al. patent, a small amount of an acid anhydride (e.g., 0.05–1% and preferably 0.08–0.2 weight percent) and water is admixed to the crude oil prior to the degumming. The base admixture step may be conducted at any time after phase separation or partitioning of the aqueous phase from the oil occurs. This partitioning enables admixture of base while still maintaining the oil phase substantially free from the added base. Alternatively, the aqueous phase (i.e., the gum) may be separated from the oil phase as disclosed in the degumming process of U.S. Pat. No. 2,782,216 and base then being added to the recovered wet gum product. Accordingly, it is unnecessary to actually separate (e.g., by centrifugation) the aqueous wet gum phase from the oil phase. The base may be added at any time after the lecithin becomes hydrated (i.e., insoluble in the oil).

Depending upon the process conditions employed, the wet gum solids content can vary considerably (e.g., from about 20–80% wet gum dry substances). Excessive water in the wet gum will normally require a greater degree of processing care to produce the desired improved product and also increase evaporative costs. Process difficulties and recovery of a high grade lecithin are also encountered when the wet gum contains an insufficient amount of water. Significantly improved processing benefits and phosphatide properties of the resultant product are achieved when the weight ratio of water to phosphatide dry substance ranges from about 1:3 to about 1:1 and most preferably at about 2:3.

After partitioning or separating the wet gum, the base is admixed to the wet gum. The amount of base admixed to the phosphatide wet gum should be sufficient to provide a dry modified phosphatide product having an acid value within the range of about 10 to about 25. Illustrative bases include the alkaline earth and alkali metal bases such as sodium hydroxide, calcium hydroxide, potassium hydroxide, sodium bicarbonate, sodium carbonate, calcium oxide, mixtures thereof and the like. Sodium hydroxide and calcium hydroxide are most suitably adapted to the process with the former being most suitable. As previously mentioned, the over-all process conditions (including the amount of added base, temperature, time of reaction) are carefully controlled to provide a dry lecithin product which has an acid value within the range of about 10 to about 25 (preferably 15 or higher). Excessive or an insufficient amount of added base which in conjunction with the other processing variables provide an acid value outside this range should be avoided. When sodium hydroxide is used as a base, the amount of base may range from about 0.5 to about 3 parts by weight sodium hydroxide for each 200 parts by weight of dry phosphatide (e.g., at 0.5% moisture). However, when it is desired to employ the more elevated temperatures for a short reaction time, the amount of sodium hydroxide will generally be between 1 to 2 parts by weight for each 200 parts of dry phosphatide.

Alternatively, the base admixture may be passed through a reaction zone (e.g., heat exchanger or batch type reactor) and dried. The resultant dried product (at 0.4% water or dry substance basis) should have an acid value ranging from about 10 to about 25. Excessive or insufficient reaction and drying conditions which fail to provide the aforementioned acid value should be avoided. Although at the lower base temperatures, the phosphatide reaction may be conducted for a period of time of about 30 minutes or (more) e.g. at temperatures of about 140° F. or (higher), e.g. significant product improvements are accomplished when the reactants are subjected to a temperature above 180° F. for a period of time not more than 5 minutes. In a continuous process, these improvements are particularly evident when the thermal treatment is accomplished in less than one minute and preferably less than about a half-minute (most preferably less than about 10 seconds).

Process conditions which are adapted to simultaneously dry and heat the reaction product mixture have been found to provide a lecithin product exhibiting exceptional emulsification properties. The drying of the base-wet gum admixture is suitably conducted under vacuum drying conditions at elevated temperatures to provide a dried lecithin product containing less than 1% moisture and preferably within the range of about 0.2% to about 0.5% (Karl Fischer method). For simultaneous drying and reacting the wet gum mixture, the best results are achieved when the pressure is less than about 20 inches mercury (absolute pressure) and preferably within the range of about 3.0 to about 10 inches mercury (absolute pressure) and the temperature is within the range of about 180 to about 250 and preferably at 200° F. or more.

As evident above, the present process is best conducted in a manner such that it becomes an integrated and continuous process with the L. P. Hayes et al. degumming process of U.S. Patent No. 2,782,216. Under such an integrated process, a wet gum product is continuously partitioned in accordance with the L. P. Hayes degumming processs and permitted to continuously flow directly to the vacuum dryer. After partitioning and before the drying thereof, aqueous base is appropriately metered into the wet gum and admixed therewith. A simple conduit (e.g., a pipe) equipped with a means of metering the appropriate amount of caustic therein and means for turbulently admixing the added caustic with the wet gum and directly leading into the vacuum dryer may be used for this purpose.

The reaction temperature and period of treatment should be conducted so as to not adversely affect the desired properties of the lecithin product. Excessive thermal treatment (e.g., elevated temperatures for prolonged period of time) will tend to darken and thicken the lecithin to such an extent its functionality is destroyed. For these reasons, especially when the base-wet gum admixture is exposed to temperatures of 180° F. or more, the period of treatment is kept at a minimum. Accordingly, if the process is conducted at the elevated temperatures of the continuous process herein disclosed, the dried product should be cooled as rapidly as possible to prevent adverse darkening or thickening of the product. Immediate cooling of the dried product to a temperature of less than 160° F., and preferably to less than 150° F., will alleviate these adverse effects. Conventional rapid cooling apparatus such as rapid cooling heat exchangers may be used for this purpose.

The phosphatides may be provided in a bleached or unbleached form. The bleaching may be accomplished at any stage of the process with conventional bleaching agents. The bleaching agents may be suitably added during the partitioning of the wet gum from the crude oil, prior to or during the base addition and usually before the drying of the modified wet gum.

In a continuous process described above, a wet gum product processed to a modified lecithin exhibiting exceptional emulsification properties can be achieved in a total period of time of about five seconds or less (e.g., about 1 to about 5 seconds). Unlike the previous wet gum process which required initial acid and base treatment or vice versus, the present process simplifies the overall processing to a single step of base addition. Comparative to the prior art (e.g., separate reaction vessels for both the acid and base reactions), equipment costs and time interval in obtaining the modified lecithin product are significantly reduced. A simple conduit operatively connected between a degumming holding tank and the vacuum dryer with means of metering the caustic into a continuous stream of wet gum has been found sufficient to practice the invention. Unlike the prior art processes which require batch type operations, the present invention affords the art with an integrated and continuous process from the initial degumming step to final preparation of the desired product.

Lecithin products prepared in accordance with the present invention possess exceptional properties. Comparative to the lecithin products recovered by the break-free oil process (which have a somewhat fruity flavor and odor), the present products exhibit a relatively bland flavor and odor. Accordingly, the use of the lecithin products herein will not adversely affect the desired flavor and odor characteristics of the ultimate desired food product containing the lecithin as a food additive. The lecithin imparts exceptional emulsification properties to powdered food products which are adapted to be reconstituted with aqueous mediums and consumed in the liquid form. The lecithin products exhibit rapid rate of hydration and wetting attributes. The lecithins are compatible with a broad range of food products provided in the dry form (e.g., proteins, carbohydrates, oils, insoluble partitioned additives, etc.) and facilitate the dispersion thereof in aqueous mediums. The lecithins herein exhibit exceptional emulsion compatibility with high ionic systems (e.g., salt and water-soluble mineral additives) and emulsion stability over a broad pH range. The lecithins are particularly suited to provide exceptionally stable emulsions having a high concentration of fat, oil and/or suspended insoluble particulate matter. If desired, non-ionic surface active agents may be used as a conjoint emulsifying agent without adversely affecting the emulsifying properties of the lecithin products herein.

The following example is merely illustrative and should not be construed as limiting the scope of the invention.

EXAMPLE 1

A wet gum was obtained by reacting at 160° F., 100 parts by weight hexane extracted crude soybean oil with 0.12 parts by weight acetic anhydride in accordance with Example 1 of U.S. Pat. No. 2,782,216. The acetic anhydride reacted crude oil was then initially admixed with 1.5 parts by weight water and then about 0.27 parts by weight of 35% aqueous hydrogen peroxide solution for each 100 parts by weight crude oil. The water phase containing the hydrated acid anhydride reacted lecithin was then separated from the oil via a continuous discharge centrifuge. A continuous flow of the centrifuged aqueous phase was then conducted directly to vacuum drier, a continuous wiped film evaporator, with 0.6 parts by weight sodium hydroxide for each 100 parts by weight of dry substance of wet gum being metered into the wet gum immediately prior to its admission into the dryer. The vacuum drier was maintained at 240° F. and 3 inches mercury (absolute pressure) with a total drying time being approximately 10 seconds and the resultant reaction product emitting from the dryer having a moisture content of 0.2% (Karl Fischer method). Immediately after egression from the vacuum dryer, the modified dry lecithin was cooled in a rapid heat exchanger to a temperature of 150° F. (total residue time above 180° F. being less than about 10 seconds).

A typical lecithin product produced in accordance with this example is characterized as having the following properties:

Moisture [1] (Karl Fischer) _____ 0.5 maximum.
Color [2] (Gardner Scale 1) _____ 9 maximum.
Acetone insolubles [3] _____ 63.0–64.5.
pH [4] _____ 6.0–7.0.
Benzene insoluble [5] _____ 0.06 maximum.
Viscosity @ 77° F.[6] _____ 70 cps. maximum.
Acid value [7] _____ 16.

[1] A.O.C.S. Official Method Ca 2e–55.
[2] NSPA 1972–73 Year Book and Trading Rules—page 64, 5% solution in mineral oil—Gardner Color 1933.
[3] A.O.C.S. Official Method Ja 4–66.
[4] 10 g. lecithin—90 g. distilled water mixed for 3 minutes in Waring Blender—pH determined on mixture.
[5] A.O.C.S. Official Method Ja 3–55.
[6] A.O.C.S. Official Method Ka–6–59.
[7] A.O.C.S. Official Method Ja 6–55.

The stability of emulsion containing a high level of fat was determined by thoroughly blending 45 grams lard, 45 grams beef tallow, 5 milligrams Sudan IV dye and 10 grams of the modified lecithin product of this example. Six and one half grams of the resultant lecithin-fat blend was then added to 100 ml. of hot tap water (165° F.) and stirred at a moderate speed in a standard household mixer for about one minute. A 100 ml. aliquot portion of the aqueous-lecithin-fat blend was poured into a 100 ml. graduated cylinder and allowed to stand for 30 minutes whereupon the cylinder was observed for a red color layer. The emulsion stability thereof was determined as being excellent since the total red colored fat layer was less than one ml.

Since many embodiments of this invention may be made and since many changes may be made in the embodiments described, the foregoing is to be interpreted as illustrative only and the invention is defined by the claims appended hereafter.

What is claimed is:

1. A process for preparing a phosphatide exhibiting improved emulsification properties from a phosphatide containing vegetable crude oil, said method comprising the steps of:
  (a) treating a phosphatide containing vegetable oil with water and a small amount of an organic acid anhydride,
  (b) partitioning the oil from the water phase to provide a wet gum comprised of water and the phosphatide-organic acid anhydride reaction product,
  (c) admixing to the partitioned wet gum at least one member selected from the group consisting of an alkaline earth metal base and alkali metal base,
  (d) drying the wet-gum base admixture at a temperature of at least 140° F. to a moisture content of less than 1% by weight, with the amount of base admixed to the wet gum, temperature and period of treatment at temperatures in excess of 140° F. being sufficient to provide a dry phosphatide product which has an acid value of between about 10 to about 25.

2. The process according to claim 1 wherein the base-wet gum admixture is subjected to a temperature in excess of 140° F. for a period of time no greater than five minutes.

3. The process according to claim 1 wherein the drying is conducted at temperatures greater than 180° F. and the admixture is simultaneously dried to moisture content of less than 1% and reacted to an acid value of between 10 to 25 in a period of time of less than about a half minute.

4. The process according to claim 3 wherein the anhydride is acetic anhydride.

5. The process according to claim 3 wherein the weight ratio of water to phosphatide dry substance ranges from about 1:3 to about 1:1 and the amount of base added to the wet gum ranges from about 0.5 to about 3.0 parts by weight base for each 200 parts by weight dry phosphatide.

6. The process according to claim 5 wherein the base is a water soluble metal hydroxide.

7. The process according to claim 3 wherein between 1 to 2 parts by weight sodium hydroxide is admixed with each 200 parts by weight dry phosphatide and the admixture is dried to a moisture content of less than about 0.5% by weight at a temperature of about 200° F. to about 250° F.

8. The process according to claim 7 wherein the dry phosphatide is immediately cooled to a temperature less than 160° F.

9. The process according to claim 6 wherein about 1 to about 2 parts by weight base is admixed with each 200 parts by weight phosphatide (dry substance basis).

10. The process according to claim 8 wherein the thermal treatment of the admixture at temperatures of greater than 180° F. is less than about 10 seconds.

11. The process according to claim 10 wherein the acid anhydride is acetic anhydride.

12. The process according to claim 11 wherein the weight ratio of water to dry phosphatide is about 2:3.

13. The process according to claim 9 wherein the acid value of the dry phosphatide ranges from about 15 to about 25.

14. The dry phosphatide prepared in accordance with the process of claim 1.

15. The dry phosphatide prepared in accordance with the process of claim 11.

References Cited

UNITED STATES PATENTS

| | | | |
|---|---|---|---|
| 3,499,017 | 3/1970 | Davis | 260—403 |
| 3,704,254 | 11/1972 | Aneja | 260—403 |
| 3,134,794 | 5/1964 | Myers | 260—403 |

ELBERT L. ROBERTS, Primary Examiner

U.S. Cl. X.R.

260—424

UNITED STATES PATENT OFFICE
CERTIFICATE OF CORRECTION

Patent No. 3,823,170            Dated July 9, 1974

Inventor(s) Paul A. Seaberg and Lester P. Hayes

It is certified that error appears in the above-identified patent and that said Letters Patent are hereby corrected as shown below:

Column 1, line 27; for "lecithin (from" read ---lecithin) from---
Column 3, line 37; for "lower base temperatures" read ---lower temperatures---
Column 3, bridging lines 39/40; for "(more) e.g. at temperatures of about 140°F. or (higher), e.g. significant" read ---more (e.g., at temperatures of about 140°F. or higher), significant---
Column 5, Footnote 3; for "4-66" read ---4-46---

Signed and sealed this 3rd day of December 1974.

(SEAL)
Attest:

McCOY M. GIBSON JR.          C. MARSHALL DANN
Attesting Officer            Commissioner of Patents